US011231960B2

(12) United States Patent
Cheng et al.

(10) Patent No.: US 11,231,960 B2
(45) Date of Patent: Jan. 25, 2022

(54) METHOD AND SYSTEM FOR MANAGING DATA STREAM PROCESSING

(71) Applicant: NEC LABORATORIES EUROPE GMBH, Heidelberg (DE)

(72) Inventors: Bin Cheng, Sandhausen (DE); Apostolos Papageorgiou, Heidelberg (DE); Martin Bauer, Eppelheim (DE)

(73) Assignee: NEC CORPORATION, Tokyo (JP)

( * ) Notice: Subject to any disclaimer, the term of this patent is extended or adjusted under 35 U.S.C. 154(b) by 133 days.

(21) Appl. No.: 16/072,503

(22) PCT Filed: Feb. 29, 2016

(86) PCT No.: PCT/EP2016/054242
§ 371 (c)(1),
(2) Date: Jul. 25, 2018

(87) PCT Pub. No.: WO2017/148503
PCT Pub. Date: Sep. 8, 2017

(65) Prior Publication Data
US 2019/0065249 A1    Feb. 28, 2019

(51) Int. Cl.
*G06F 9/46*   (2006.01)
*G06F 9/48*   (2006.01)
*G06F 9/50*   (2006.01)

(52) U.S. Cl.
CPC .......... *G06F 9/4881* (2013.01); *G06F 9/4843* (2013.01); *G06F 9/5066* (2013.01); *G06F 9/5083* (2013.01)

(58) Field of Classification Search
CPC .... G06F 9/4881; G06F 9/4843; G06F 9/5066; G06F 9/5083
See application file for complete search history.

(56) References Cited

U.S. PATENT DOCUMENTS 8,286,191 B2    10/2012 Amini et al.
9,072,042 B2     6/2015 Berg et al.
(Continued)

FOREIGN PATENT DOCUMENTS

WO    WO 2015058801 A1    4/2015

OTHER PUBLICATIONS

Abu-Elkheir et al, Data Management for the Internet of Things: Design Primitives and Solution, Sensors, Nov. 2013, pp. 15582-15612.*

(Continued)

*Primary Examiner* — Diem K Cao
(74) *Attorney, Agent, or Firm* — Leydig, Voit & Mayer, Ltd.

(57) ABSTRACT

A method of the invention manages data stream processing tasks of an application topology in a stream processing system, the stream processing system having one or more data producers, one or more compute nodes, and one or more result consumers, includes: assigning geographic scope granularities to the data stream processing tasks of the application topology; receiving, by a task manager from a result consumer of the one or more result consumers, a subscription in order to trigger data processing for computing a result, the subscription including geographic scope related information concerning the triggered data processing]; generating, by the task manager based on the geographic scope related information of the subscription, an execution plan including task instances for performing the triggered data processing; and generating, by the task manager from the execution plan, a deployment plan for deploying the task instances of the execution plan on the compute nodes.

15 Claims, 10 Drawing Sheets

(56) References Cited

U.S. PATENT DOCUMENTS

| | | | | |
|---|---|---|---|---|
| 2004/0117037 | A1* | 6/2004 | Hinshaw | G06F 16/273 |
| | | | | 700/2 |
| 2011/0213802 | A1 | 9/2011 | Singh et al. | |
| 2015/0278860 | A1* | 10/2015 | Rayanchu | G06F 16/9537 |
| | | | | 705/14.45 |
| 2016/0350146 | A1* | 12/2016 | Udupi | G06F 9/5027 |

OTHER PUBLICATIONS

Ashish Vulimiri et al: "WANalytics: Analytics for a Geo-distributed Data-Intensive World", CIDR 2015, Seventh Biennial Conference on Innovative Data Systems Research, Asilomar, CA, USA, Jan. 4-7, 2015, Online Proceedings, Jan. 4, 2015 (Jan. 4, 2015),-Jan. 7, 2015 (Jan. 7, 2015), pp. 1-9, XP055279788.

Satyanaraynan Mahadev et al: "Edge Analytics in the Internet of Things", IEEE Pervasive Computing, IEEE Service Center, Los Alamitos, CA, US, vol. 14, No. 2, Apr. 1, 2015 (Apr. 1, 2015), pp. 24-31, XP011579350.

* cited by examiner

```
{
    "type": "district_min",
    "scope": [
        {district: "D1"}  ← more constraints
                            can be introduced
    ]
}
```

METHOD AND SYSTEM FOR MANAGING DATA STREAM PROCESSING

CROSS-REFERENCE TO PRIOR APPLICATIONS

This application is a U.S. National Stage Application under 35 U.S.C. § 371 of International Application No. PCT/EP2016/054242 filed on Feb. 29, 2016. The International Application was published in English on Sep. 8, 2017, as WO 2017/148503 A1 under PCT Article 21(2).

FIELD

The present invention relates to a method and system for managing data stream processing tasks of a predefined application topology in a stream processing system.

BACKGROUND

In a stream processing framework or a data flow management system, a set of inter-connected tasks are typically defined within an application topology to be scheduled and deployed over multiple compute nodes in a distributed environment such as a cloud or cluster. In such a system, a deployment plan is generated for each application topology to determine how many task instances are needed and on which compute node to execute them.

SUMMARY

In an embodiment, the present invention provides a method for managing data stream processing tasks of a predefined application topology in a stream processing system, the stream processing system having one or more data producers, one or more compute nodes, and one or more result consumers. The method includes: assigning geographic scope granularities to the data stream processing tasks of the predefined application topology; receiving, by a task manager from a result consumer of the one or more result consumers, a subscription in order to trigger data processing for computing a result, the subscription including geographic scope related information concerning the triggered data processing]; generating, by the task manager based on the geographic scope related information of the subscription, an execution plan including task instances for performing the triggered data processing; and generating, by the task manager from the execution plan, a deployment plan for deploying the task instances of the execution plan on the compute nodes.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 5 is an example of a subscription according to an embodiment of the present invention in JavaScript Object Notation;

DETAILED DESCRIPTION

Figure 1:
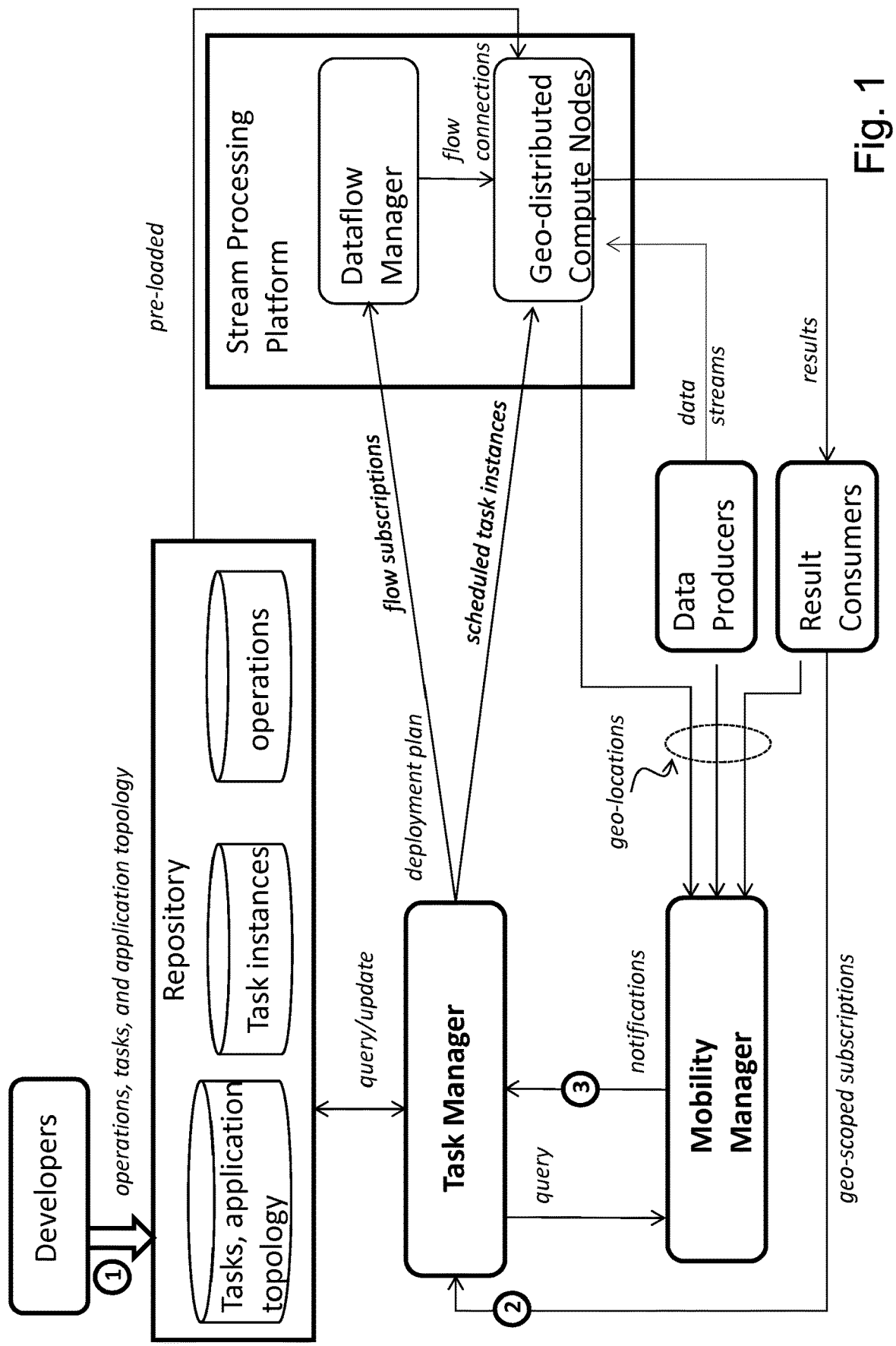
FIG. 1 is a schematic view illustrating a method and system according to an embodiment of the present invention.

According to known methods and systems, the way to generate actual deployment plans does not support partial data processing, meaning that the entire processing logic defined by the application topology will be completely launched once the application topology is submitted. The changes to the running deployment plans, such as generating a new task instance or terminating an existing task, are allowed via some interfaces, but still need to be managed by system administrators manually. The inventors have recognized that this is particularly disadvantageous.

In the state of the art, some existing stream processing platform systems, such as Heron, Storm, Spark Streaming, S4, and Samza, might be used to support customized stream processing for large scale IoT (Internet of Things) systems. However, the inventors have recognized that they are inefficient to IoT systems and fail to provide low latency results for actuators. This is because, for example: (1) Current solutions allow application developers to specify an application topology for defining certain stream processing logic with multiple tasks. However, the entire application topology is relatively static and can only be launched entirely when the application topology is submitted. They do not allow launching a subset of the predefined application topology to perform a part of data processing logic for producing reusable intermediate results; (2) Different application topologies must be specified manually by application developers in order to perform the same computation on different scopes of data sources; and (3) Application topology construction and task assignment are not adapted to the mobility of sensors and actuators. For example, it is referred to the following non-patent literature: (1) M. Satyanarayanan et. al, "Edge Analytics in the Internet of Things." *IEEE Pervasive Computing* 2 (2015): pp. 24-31; (2) F. Huici et al., "Blockmon: A high-performance composable network traffic measurement system," *ACM SIGCOMM Computer Communication Review* (2012), vol. 42, no. 4, pp. 79-80; (3) Vulimiri et. al, "Wanalytics: Geo-distributed analytics for a data intensive world," *Proceedings of* the 2015 *ACM SIGMOD International Conference on Management of Data.* ACM(2015), pp. 1087-1092; (4) Toshniwal et al., "Storm twitter," in *Proceedings of the* 2014 *ACM SIGMOD International Conference on Management of Data* (2014), pp.

147-156; and (5) S. Kulkarni et. al, "Twitter heron: Stream processing at scale," *Proceedings of the 2015 ACM SIG-MOD International Conference on Management of Data* (2015), pp. 239-250.

In view of the above, an aspect of the present invention provides an improved method and a system for managing data stream processing tasks of a predefined application topology in such a way that a more efficient and more flexible geo-distributed stream processing, in particular for large scale IoT systems, is achieved.

An embodiment of the invention provides a method for managing data stream processing tasks of a predefined application topology in a stream processing system. The stream processing system includes one or more data producers, one or more compute nodes and one or more result consumers. The geographic scope granularities are assigned to the data stream processing tasks of the application topology A result consumer sends a subscription to a task manager in order to trigger data processing for computing a result. The subscription includes geographic scope related information concerning the triggered data processing. Based on the geographic scope related information of said subscription, the task manager generates an execution plan including task instances for performing the triggered data processing. The task manager generates from the execution plan a deployment plan for deploying the task instances of the execution plan on the compute nodes.

Furthermore, an embodiment of the invention provides a stream processing system for managing data stream processing tasks of a predefined application topology, the system including one or more data producers, one or more compute nodes, one or more result consumers and a task manager. The system is configured to assign geographic scope granularities to the data stream processing tasks of the application topology. A result consumer is configured to send a subscription to the task manager in order to trigger data processing for computing a result. The subscription includes geographic scope related information concerning the triggered data processing. The task manager is further configured to generate an execution plan including task instances for performing the triggered data processing based on the geographic scope related information of said subscription. The task manager is further configured to generate from the execution plan a deployment plan for deploying the task instances of the execution plan on the compute nodes.

According to the invention, it has first been recognized that a manual approach is unsuitable for stream processing network systems, in particular for large scale Internet of Things (IoT) systems in which partial data processing needs to be established for various data scopes on demand and should be maintained based on the availability and mobility of devices such as sensors and actuators, because deployment plans need to adapt to various data scopes and system dynamics introduced by device movements on the fly. In this case, the task management complexity cannot be handled suitably by humans. Furthermore, the inventors have recognized that this problem can be overcome by a method or a system that automatically generates, configures and/or manages tasks to support on-demand partial processing over scoped data sources.

Specifically, a stream processing system includes one or more data producers, one or more compute nodes and one or more result consumers. The stream processing system may include a large number of data producers, compute nodes and result consumers. In order to provide an automatic generating, configuring and/or managing of data stream processing tasks, according to the invention, geographic scope granularities are assigned to the data stream processing tasks of the application topology in order to establish geographic task scope granularities. Thus, when a result consumer sends a subscription, e.g. in the form of a message, to a task manager in order to automatically trigger data processing for computing a result, the subscription includes geographic scope related information concerning the triggered data processing. The task manager may be an entity within the stream processing system. The subscription including geographic scope related information may also be designated as geo-scoped subscription. This geographic scope related information included in the subscription is employed for specifying the required data processing. Thus, based on the geographic scope related information of the subscription, the task manager generates an execution plan including task instances for performing the triggered data processing, wherein the task manager considers the geographic task scope granularities. Thereupon, the task manager generates from the execution plan a deployment plan for deploying the task instances of the execution plan over the compute nodes of the stream processing system.

Hence, by doing this, an efficient, flexible and low latency geographic distributed stream processing may be achieved, in particular for large scale IoT systems.

A geographic scope granularity of a stream processing task may function and/or may be employed as scope, i.e. scope of application, for the stream processing task. The geographic scope granularity of the task may define and/or may specify a state and/or a dimension of being composed of multiple smaller specific and/or predetermined geographic scopes. The geographic scope related information included in the subscription may be used to specify a specific scope, i.e. a specific scope of application, for the subscription, wherein this specific scope of the subscription may be defined by a set of geographic scope constraints.

The generated deployment plan may be executed by an underlying stream processing framework or a data flow management system in a distributed environment to generate results that are subscribed by result consumers.

According to embodiments of the invention, the geographic scope granularities of the data stream processing tasks may be defined based on geographic location attributes associated with data streams. By doing this, performing of entire or partial data processing over scoped and customized data sources on demand is enabled. Thus, the system efficiency is improved.

According to embodiments of the invention, the geographic scope related information of the subscription may include a stream type, wherein the stream type is an output stream type of one or more data stream processing tasks of the application topology in order to determine a set of data stream processing tasks that are to be involved in the triggered data processing. Thus, a set of tasks for computing the result requested by the subscription can be fast and efficiently identified.

According to embodiments of the invention, the geographic scope related information may include one or more geographic scope constraints for determining and/or limiting a set of input streams that are to be processed by the data processing triggered by the subscription from the result consumer. The geographic scope constraints may be defined based on geographic location attributes associated with data streams. Thus, the required data streams that are to be processed by the involved tasks for computing the requested result can be efficiently determined.

According to embodiments of the invention, the geographic location attributes associated with data streams may include and/or specify physical geographic locations and/or logical geographic locations of data producers generating and/or publishing the data streams. Thus, a flexible implementation and execution of automatic data processing can be achieved.

According to embodiments of the invention, one or more of the following properties of a data stream may be considered and/or employed for the geographic location attributes that are associated with data streams: an identifier of a data producer generating the data stream; coordinates of the location of a data producer generating the data stream; an address of the location of a data producer generating the data stream; and a logical location of a nearby compute node.

Thus, a flexible and efficient automatic data processing can be implemented and performed.

According to embodiments of the invention, a number of task instances for each data stream processing task that is to be involved in the triggered data processing may be determined based on the geographic scope granularity of the data stream processing task and based on geographic location attribute values of available data streams. Thus, the task instances required for the triggered data processing may be efficiently computed and generated.

According to embodiments of the invention, the task instances of the execution plan may be configured with input streams in a bottom-up manner Each task instance of a data stream processing task is assigned to a unique geographic location attribute value of the geographic location attribute defined by the geographic scope granularity of the data stream processing task. The task instances at the lowest layer may get the input streams directly from available data streams belonging to their geographic location attribute values. Task instances at an upper layer get the input streams from output streams generated by task instances at the layer below. Thus, the data streams may be efficiently assigned to the data stream processing tasks.

According to embodiments of the invention a minimal execution plan may be generated by subtracting from the execution plan task instances that have been already triggered and executed by one or more prior subscriptions. Computed results of the already triggered and executed task instances are reused for the current triggered data processing. Thus, computation sharing at various levels may be enabled and maximized.

According to embodiments of the invention, the compute nodes, data producers and/or result consumers of the stream processing system may be associated with logical geographic location information in order to be organized within a hierarchical logical network topology. The task manager may generate the deployment plan by using a heuristic optimization algorithm. Task assignments of the deployment plan are computed based on the logical geographic location information of the compute nodes, data producers and/or result consumers such that cross traffic within the hierarchical logical network topology, preferably without overloading compute nodes, is reduced. Thus, low latency analytic results, e.g., for actuators with less internal data traffic may be provided.

For example, the logical geographic location information may include a layer number, a site number and a compute node number.

Furthermore, the data producers and the result consumes may be associated with nearby compute nodes in order to be organized within the hierarchical logical network topology. A compute node associated with a data producer determines where a data source is located in the hierarchical logical network topology. A compute node associated with a result consumer determines a final data destination in said hierarchical logical network topology.

According to embodiments of the invention, the computation of the task assignments of the deployment plan may be further based on available resources of running compute nodes and/or based on accessibility of running compute nodes. Thus, the efficiency of the triggered data processing may be improved.

According to embodiments of the invention the data stream processing tasks of the application topology may include the following parameters: name of the task; name of the operation performed by the task; scope granularity of the task; type of one or more input streams to be subscribed by the operation associated with the task; and type of one or more output streams to be published by the operation associated with the task.

Thus, the data stream processing tasks of the application topology may include a task name parameter, an operation name parameter, a task scope granularity parameter, an input stream parameter and/or an output stream parameter. Hence, the handling of the tasks in order to perform the triggered data processing may be implemented in a suitable and flexible way.

According to embodiments of the invention a mobility manager may be provided for monitoring and/or recording geographic location information of the data producers, compute nodes and/or result consumers. The geographic location information may include physical and/or logical geographic location information. The mobility manager may be an entity within the stream processing system. Thus, e.g., tasks can be assigned to compute nodes based on where data sources are located and where results are consumed in a hierarchical network topology. Hence, a flexible implementation and execution of automatic data processing can be provided.

For example, the mobility manager may be queried by the task manager for available data streams that meet one or more geographic scope constraints of the subscription.

According to embodiments of the invention, the mobility manager may notify the task manager about changes of the geographic location information in order to update the execution plan and/or the deployment plan based on detected changes of the geographic location information of data producers, compute nodes and/or result consumers. Thus, device mobility can be supported. Specifically, the mobility of data producers, results consumers and also compute nodes is considered. Hence, data stream processing tasks may be created, migrated, and terminated on demand by reconfiguring and redeploying tasks during the runtime according to device mobility.

According to embodiments of the invention, the task manager may be configured to update the execution plan and/or the deployment plan based on detected changes of geographic location information of the data producers, the result consumers and/or the compute nodes during runtime.

A method and or a system according to an embodiment of the invention may provide an automatic generation, configuration and management of data stream processing tasks for performing dynamic and cost-efficient data processing over geographic scoped data sources for IoT (Internet of Things) applications in a system setting with a large number of geographic distributed data producers, result consumers and compute nodes.

At least one embodiment of the invention may have at least one of the following advantages: Increasing system efficiency and cost-effectiveness: performing entire or partial data processing logic over scoped and customized data sources on-demand; Providing low latency analytics results for actuators with less internal data traffic: assigning tasks to compute nodes based on where data sources are located and where results are consumed in a hierarchical network topology; Enabling and maximizing computation sharing at various levels: computation can be shared and reused across subscribers and applications. Trigger only involved data processing of the application topology with scoped data and resource is only needed for handling demanded data and required processing; and Supporting device mobility: data processing tasks can be created, migrated, and terminated on demand by reconfiguring and redeploying tasks during the runtime according to device mobility.

FIG. 1 is a schematic view illustrating a method and a system according to an embodiment of to the present invention. Specifically, FIG. 1 illustrates a basic workflow of distributed stream processing based on geographic scopes that may also be designated as geo-scopes. The embodiment of FIG. 1 is very suitable for large scale Internet of Things (IoT) systems that consist of a large number of geographic distributed data producers, result consumers and compute nodes. Data producers may be sensors such as cars, glasses, video cameras and mobile phones, being connected to the system via different types of edge networks (e.g., WiFi, ZigBee, 4G or fixed networks). The data producers are constantly and/or periodically reporting heterogeneous, dimensional and/or unstructured data streams over time.

On the other hand, result consumers may be actuators or external applications that expect to receive real-time analytics results derived from sensor data and then take fast actions accordingly. Both data producers and result consumers are tagged with updated physical and/or logical geographic location information and they might be able to move around.

In between data producers and result consumers, there are lots of compute nodes located at different locations, i.e. geographic distributed, either at the network edges or in the cloud, being able to perform data stream processing tasks defined in the application topology.

Some of the compute nodes as depicted in FIG. 1 are considered to be able to move around as well. For example, compute nodes can be located at connected cars, flying drones, or moving robots. Furthermore, mobile phones may be considered as a compute node in some use cases.

The method and stream processing system according to the embodiment of FIG. 1 can automatically generate, configure, and manage tasks of a predefined application topology in a stream processing framework or alike, to support on-demand partial processing over various data scopes with regard to the geographic availability and mobility of devices. The embodiment of FIG. 1 can make the run-time stream processing automatically adapted to geo-scoped subscriptions, i.e. subscriptions including geographic scope related information, and the mobility of devices, thus, resulting in efficient and low latency geo-distributed stream processing for large scale IoT systems.

The embodiment of FIG. 1 includes the following steps: (1) defining tasks with customized geographic scope granularities to form an application topology; (2) automatically generating a deployment plan to perform demanded, e.g. partial, data processing requested by each geo-scoped subscription from a result consumer; and (3) automatically updating the deployment plan in real-time by monitoring the mobility of data producers, results consumers, and also compute nodes.

In the following, the three above-described steps of the embodiment illustrated in FIG. 1 are described in more detail, in particular with regard to substeps, and in connection with FIG. 2 to FIG. 9 referring to further embodiments.

Step 1. illustrated in FIG. 1—Defining tasks with customized geo-scope granularity to form an application topology:

An application topology is to be provided by developers to define the high-level data processing logic, which includes (consists of) multiple data stream processing tasks at different layers. Each task is a data stream processing unit that performs a certain operation over a set of selected input data streams and then generates a set of output data streams. Tasks can be executed by compute nodes once their parameters have been set. According to the embodiment of FIG. 1, the following parameters are required by each task:

Name: the name of the task, given by the developer in the application topology;

Operation: the name of the operation to be performed by the task; the operation is some implemented program code to be invoked by the task for performing the actual data stream processing, such as a dockerized application or an executable function;

Scope_Granularity: the scope_granularity parameter of the task is to control the geo-scope of the input streams to be handled by each task instance; a geo-scope granularity is defined based on the available geographic location attributes associated with data streams. For example, each data stream can have the following geographic location properties: (1) data producer, e.g. the ID of the data producer; (2) the GPS coordinates (latitude, longitude) of the data producer's location; (3) the address of the data producer's geographic location comprising for example section, district, city and/or country; (4) the logical location of the nearby compute node comprising for example layer number, site number and/or compute node number. These properties that may be considered for geographic location attributes can constitute profile information of data streams, i.e. information that characterizes the data streams. They can be used to specify the geographic scope_granularity property of input streams, which indicates how many task instances are needed and how to group the available input streams into task instances at the next step, Step 2. Geo-scopes are to be specified for each task as the hints to enable automatic task management later on. For example, the geo-scope hint is introduced for producing fine-grained intermediate results for various scoped data sources to enable efficient task sharing and partial data processing.

Input_Streams: defining the type of input streams to be subscribed by the internal operation associated with the task. Each type of input streams can be specified by a type name, which limits which type of input streams can be selected as the input streams for the tasks, together with the scope constraint of the task. Every stream (either new streams generated by running task instances or original streams published by external data producers) has a type to represent the type of stream data inside; multiple streams can share the same type.

Output_Streams: defining the type of output streams to be published by the internal operation associated with the task. Each type of output streams can be specified by a type name, representing the type of stream data generated by the task. The type of output streams can be referred by the other tasks in the same application topology to form their input streams.

Figure 2:
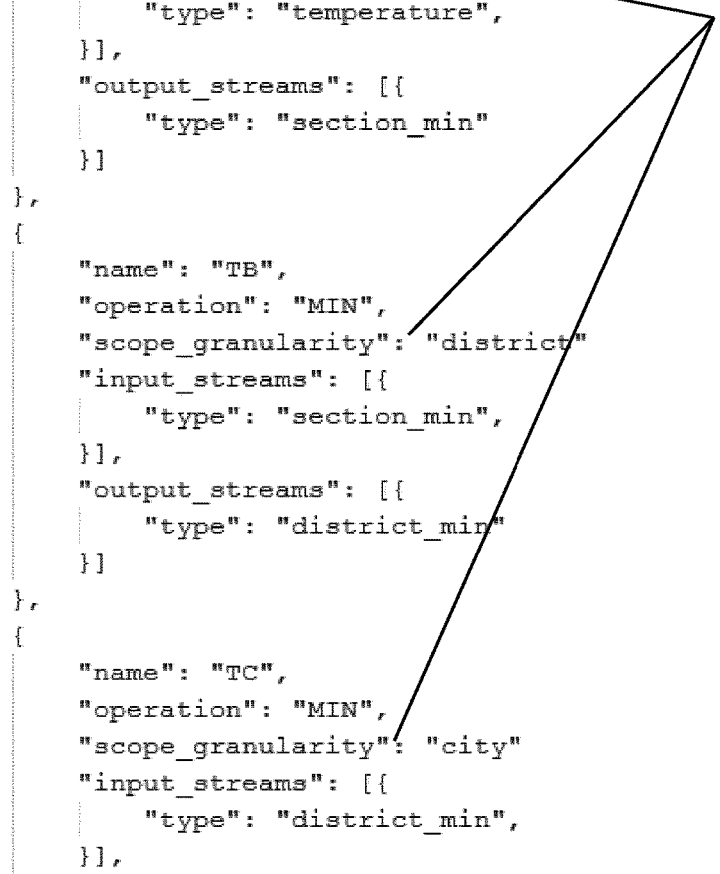
FIG. 2 is an example of an application topology according to an embodiment of the present invention in JavaScript Object Notation.

FIG. 2 shows an example of an application topology according to an embodiment of the present invention, specified in JSON (JavaScript Object Notation) format. In this application topology named "test", three geo-scoped tasks namely "TA", "TB" and "TC" are defined with geographic location attributes of location address to generate minimal temperature values from a set of geo-distributed temperature sensors at different levels: at section level, at district level, and at city level. These three tasks share the same operation because they just need to do the same type of data processing for different input streams.

Figure 3:
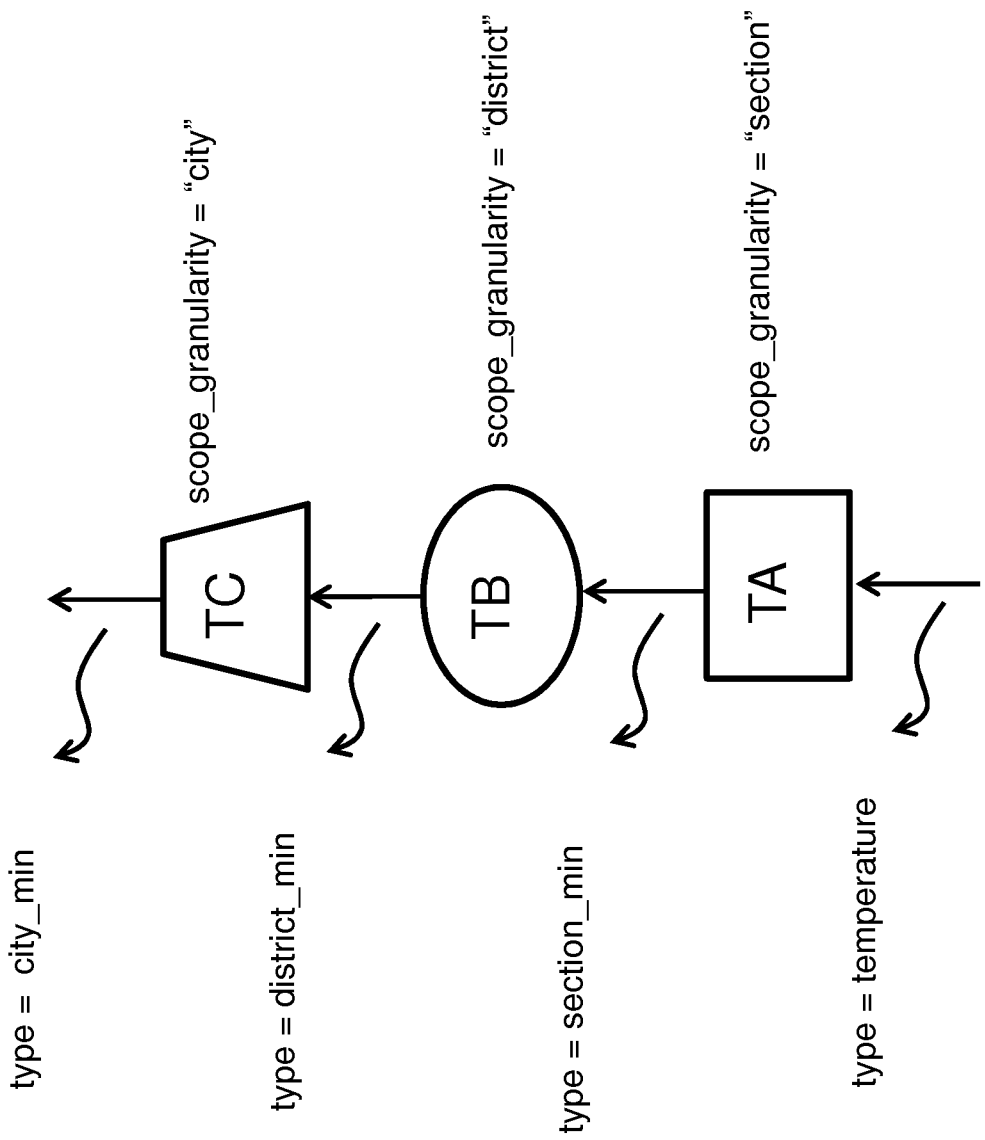
FIG. 3 is a schematic view illustrating a visualization of the application topology according to the example of FIG. 2.

FIG. 3 shows a schematic view illustrating a visualization of the application topology according to the example of FIG. 2.

Step 2. illustrated in FIG. 1—Automatically generating a deployment plan to perform demanded full or partial data processing requested by each geo-scoped subscription from a result consumer:

Part of the method and the stream processing system according to the embodiment of FIG. 1 is done by the task manager. As illustrated by FIG. 1, upon receiving a geo-scoped subscription from a result consumer, the task manager generates a deployment plan to perform the demanded full or partial data processing.

To generate and provide the deployment plan, the task manager uses the following input information: (1) the application topology with predefined tasks having geographic scope granularities; (2) the geo-scoped constraints within the coming subscription; and (3) the geographic locations of available data streams.

The generated deployment plan will be given to the underlying stream processing or data flow management system for carrying out the generated task instances over compute nodes in a distributed manner.

The deployment plan of FIG. 1 includes the following output information: (1) scheduled task instances, which are the task instances with already configured input parameters, such as their selected input streams and their output streams; and (2) flow subscriptions including cross-node flows which are the data flows to be established across compute nodes for ensuring task instances can get their input streams from another connected task located at different compute nodes.

Figure 4:
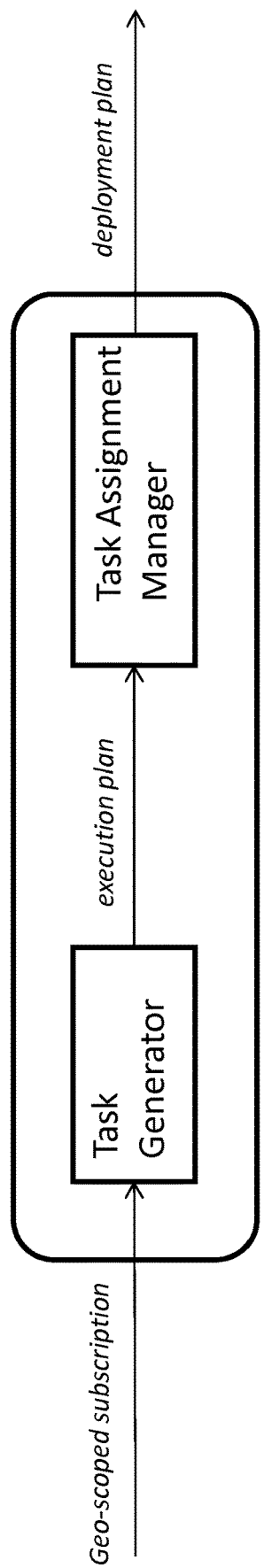
FIG. 4 is a schematic view illustrating internal components of a task manager according to an embodiment of the present invention.

FIG. 4 shows internal components of a task manager according to an embodiment of the present invention for providing and performing Step 2. In this regard, the task manager may internally rely on the following two steps, Steps 2.1 and 2.2, to generate the deployment plan.

Step 2.1—Automatically generating and configuring task instances to form the execution plan required by the geo-scoped subscription in consideration of task scope granularities in the application topology and the geographic locations of available data producers (This may be carried out by the Task Generator as illustrated in FIG. 4):

A geo-scoped subscription is sent by a result consumer to trigger the demanded data processing to produce the required results.

FIG. 5 shows an example of a subscription according to an embodiment of the present invention in JavaScript Object Notation. The geo-scoped subscription illustrated in FIG. 5 includes a type name and a set of geo-scope constraints. The type name in the subscription is the type name of some output streams, determining the set of tasks to be involved in the demanded data processing logic. The geo-scope constraints within the subscription are a set of constraints to limit the set of selected input streams to be processed by the demanded data processing for generating the requested results. Each constraint is defined based on the geographic location attributes in the geographic location information of the available data producers of the stream processing system.

For example, a constraint can be defined based on GPS coordinates (latitude, longitude) or based on location address (section, district, city). The geo-scoped subscription of FIG. 5 has only one constraint. However, more than one constraint may be introduced in a subscription.

The demanded data processing is implemented by an execution plan including a set of configured task instances. The execution plan may be generated by a task generator component of the task manager for the current subscription with the following substeps:

Substep 2.1.1—Identifying involved tasks in the application topology based on the subscribed stream type:

Upon receiving a geo-scoped subscription, the task generator component first fetch the application topology from a repository as illustrated in FIG. 1 and then continues to identify the set of tasks requested by the current subscription, by searching the given stream type name from the application topology in a top-down manner. The identified tasks form the processing logic required by the result consumer to generate its demanded result. The processing logic can be the entire application topology or a part of the application topology, up to the predetermined stream type name included in the subscription.

Substep 2.1.2—Querying available data streams according to constraints given in the geo-scoped subscription and the input stream types of the tasks at the lowest layer in the processing logic:

As shown in FIG. 1, all data producers, result consumers, and compute nodes report their geographic locations—including physical locations and logical locations—to the a mobility manager. The mobility manager stores these geographic locations. By querying the mobility manager, the task generator can get the available data streams that meet the geo-scope constraints within the subscription and also the types asked by tasks at the lowest layer in the demanded processing logic, which has been figured out by the previous substep 2.1.1.

Substep 2.1.3—Determining the number of instances for each task involved in the processing logic based on the geographic task scope granularities and based on geographic location attribute values of available data streams:

The procedure to determine the number of instances for each involved task starts from the one at the lowest layer of the demanded processing logic. For a given task, the number of its instances is equal to the number of unique geographic location attribute values belonging to the geographic task scope of the given task and which are in the set of available data streams.

Substep 2.1.4—Grouping streams to configure each task instance with its assigned input streams:

Each task instance must be configured with specific input streams so that the task instances know where to fetch their input streams. This configuration process may be done by the task generator component of the task manager in a bottom-up manner, meaning that the instances of the task at the lowest layer in the processing logic need to be configured first. Each task instance is assigned to a specific unique value of the geographic location attribute defined by the task scope of the instance's task. For the task instances at the lowest layer, they get the input streams directly from the set of the available data streams as long as the input data streams belong to geographic location attribute values of the task instance. Output streams of task instances have the geographic location attribute values that are assigned to these task instances. For the task instances at upper layer, they get the input streams from the output streams generated by the task instances at the layer below. Logically, the geographic scope at high layer is larger than the one at low layer and this is to be managed by developers when they define scoped tasks, i.e. tasks with geographic scope granularities, for the application topology.

Substep 2.1.5—Subtracting some existing and reusable task instances from the entire execution plan to generate a minimal execution plan for the current subscription:

Different subscriptions can have different scopes to cover data stream sources in different regions. Therefore, some configured tasks in the entire execution plan might be already triggered by other subscribers in a different subscription before. This can be checked based on the records in the repository. For those configured tasks, their generated results can be reused in the current execution plan and there is no need to spawn them again. So the task generator will check the available configured tasks in the previous execution plans and subtract/remove them from the current execution plan for saving more computation resource. A top-down approach can be used to perform the task subtraction, which means the tasks at the top layer will be checked first. The task configurations are used to judge whether two tasks are the same with the same scope.

Substep 2.1.6—In the end, the Task Generator will forward the subtracted execution plan to the Task Assignment Manager and update the repository to record all configured tasks and their subscribers.

Figure 6:
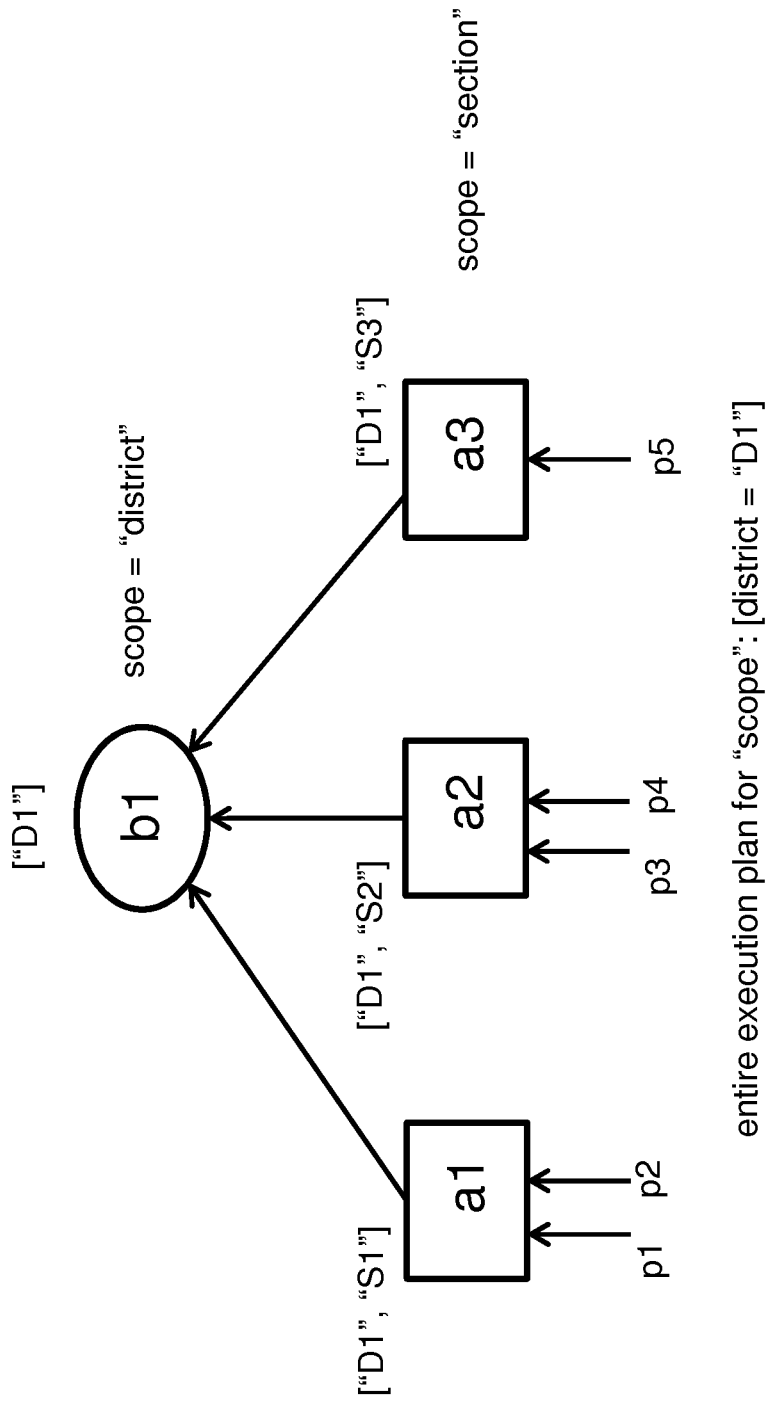
FIG. 6 is a schematic view illustrating an example of an execution plan according to an embodiment of the present invention.

FIG. 6 shows an example of how an execution plan can be dynamically and automatically derived from a predefined application topology. This execution plan is referred to the application topology shown in FIG. 2 and FIG. 3. Three tasks TA, TB and TC are defined with different geographic scopes within this application topology and they share the same implemented operation called MIN, which is to calculate the minimal temperature in a set of temperature value streams.

In an embodiment, it is assumed that there are five data producers p1, p2, p3, p4, p5 as illustrated in FIG. 6 when a scoped subscription, for instance according to the example of FIG. 4, namely:

{"type": "district_min", "scope": [{district: "D1"}]}, is received, which expects to receive the aggregated results at district level for all data producers (each of them generates a data stream) within District "D1".

In an embodiment, the geographic location profiles of Data Producers p1, p2, p3, p4, p5 are:

[D1, S1, (x1, y1)],
[D1, S1, (x2, y2)],
[D1, S2, (x3, y3)],
[D1, S2, (x4, y4)], and
[D1, S3, (x5, y5)].

Given the location information of those data producers, three instances a1, a2 and a3 of task TA and one instance b1 of task TB will be created and configured accordingly for the entire execution plan.

In the example of FIG. 6, for instance, task instance a1 of the task TA is assigned to a specific unique value S1 of the geographic location attribute "section" defined by the task scope "section" of the task TA.

For the task instance a1 at the lowest layer, it gets the input streams directly from the set of the available data streams p1, p2, p3, p4, p5 as long as the input data streams belong to the geographic location attribute value S1 of the task instance a1. An output stream of task instance a1 has the geographic location attribute value S1 that is assigned to this task instance a1. The remaining task instances a2 and a3 are configured accordingly. For the task instance b1 at upper layer, it gets the input streams from the output streams generated by the task instances a1, a2 and a3 at the layer below.

In this example, if some other low level result consumer has already triggered Task TA with section="S3" before, the configured task a3 can be removed from the entire execution plan in order to reuse task instances across different subscriptions.

Figure 7:
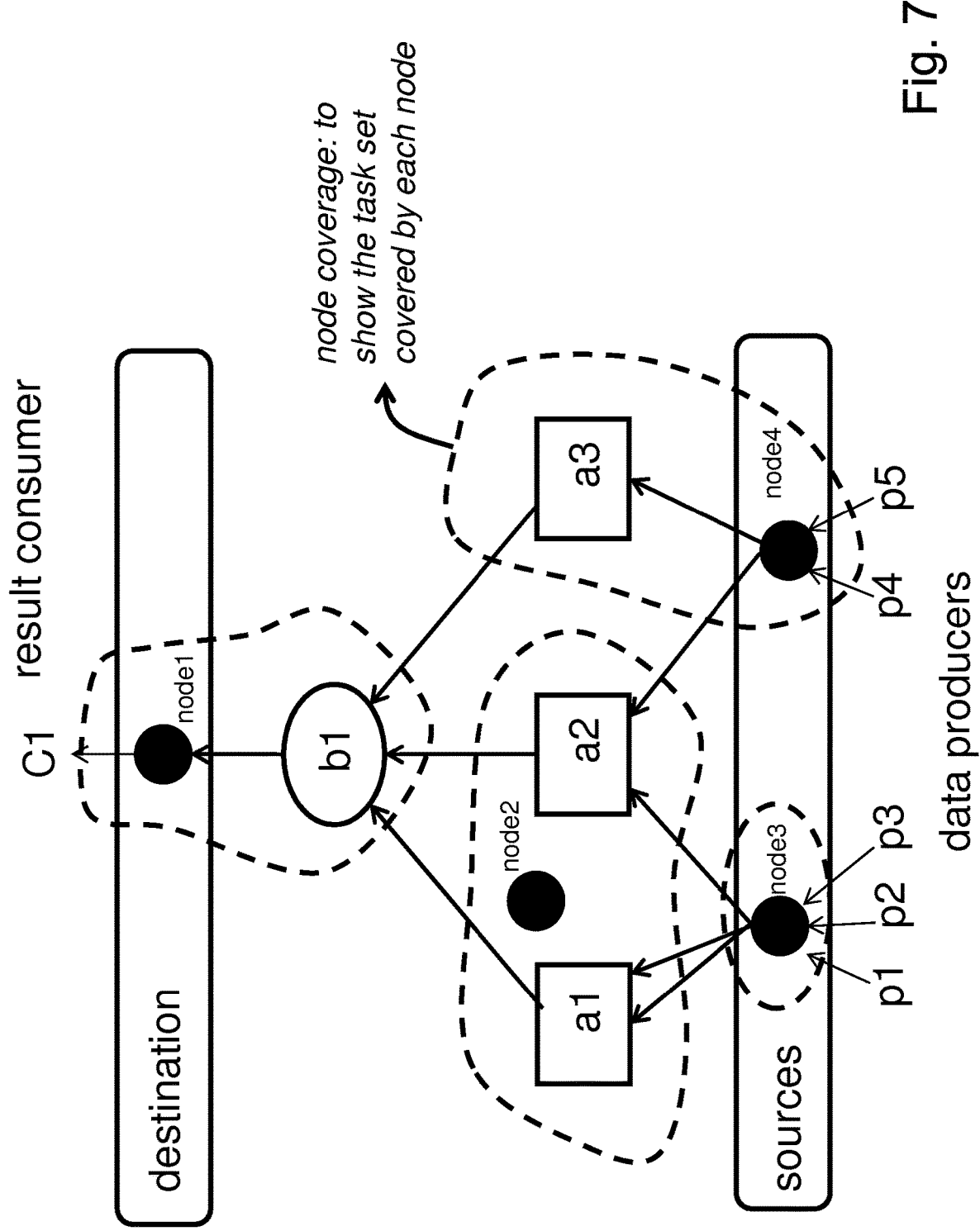
FIG. 7 is a schematic view illustrating an example of a task assignment according to an embodiment of the present invention.
Figure 8:
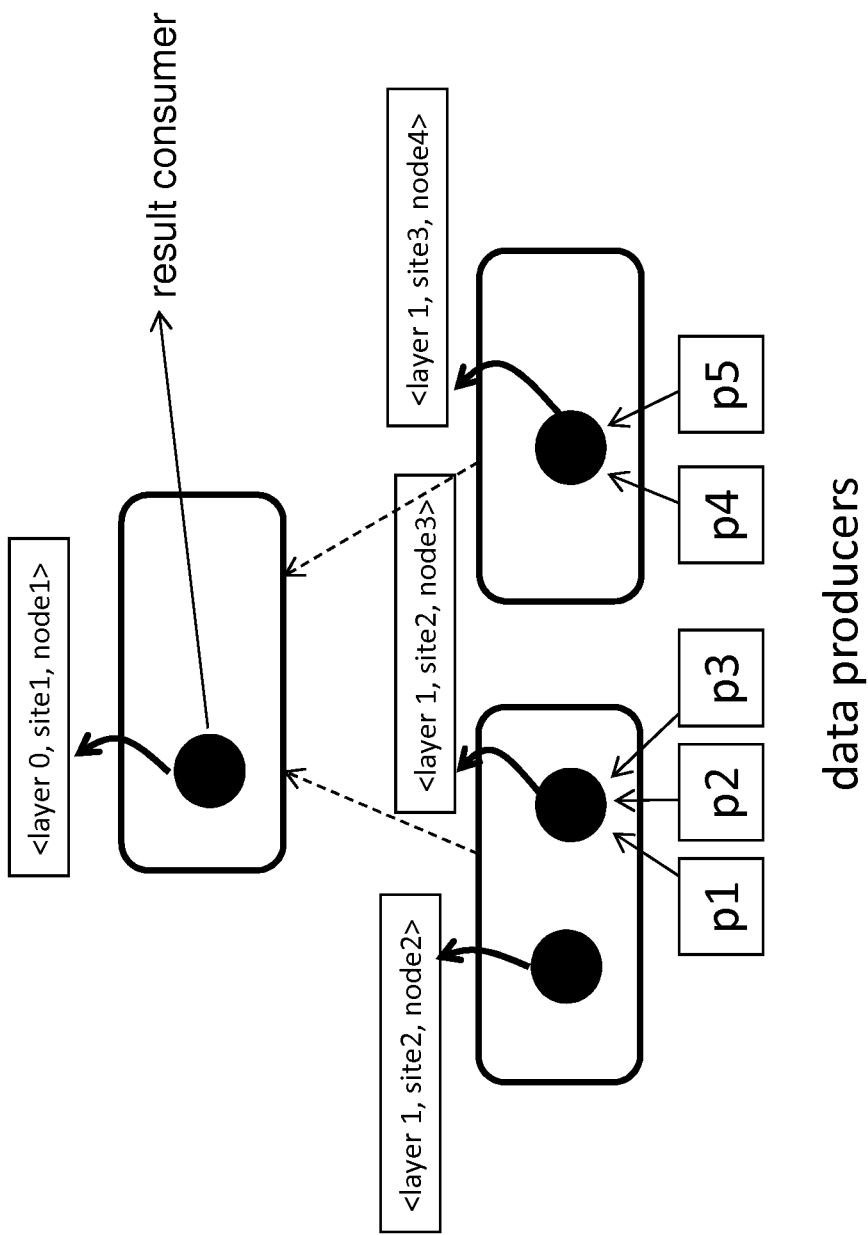
FIG. 8 is a schematic view illustrating a hierarchical logical network topology according to an embodiment of the present invention for the example of FIG. 7.

Step 2.2—Automatically generating an optimized deployment plan from the derived execution plan based on the logical locations of data producers and result consumer in a hierarchical logical network topology (This may be carried out by task assignment manager as illustrated in FIG. 4):

In this regard, FIG. 7 shows an example of a task assignment according to an embodiment of the present invention. FIG. 8 is a schematic view illustrating a hierarchical logical network topology according to an embodiment of the present invention for the example of FIG. 7.

Based on the received execution plan, a task assignment manager component of the task manager produces an optimized deployment plan, which tells the underlying stream processing framework how to deploy the already configured task instances, for the purpose of reducing cross-layer and cross-site traffic and data transmission latency.

A large number of compute nodes are distributed at different locations, but they are organized in a hierarchical manner. Each compute node may be associated with the following logical location information: layer number, site number, node number. Moreover, parent site number might be also possible. Each compute node has a unique node number but can share the same site number with a set of other compute nodes located together in the same deployment location, such as in the same cluster. The logical location information can be given manually by system managers according to their setup or assigned automatically by some additional component according to the underlying physical network topology whenever a new compute node joins. But in general the hierarchical logical network topology should reflect the underlying physical network topology. In addition, each data producer and result consumer is associated with a nearby compute node when they join the system.

Some heuristic algorithms can be used by the Task Assignment Manager to produce an "optimized" deployment plan, e.g. based on one or more the following information: (1)—the hierarchical topology of compute nodes based on their logical location information; (2) available resources of all running compute nodes, e.g. in terms of a number of vCPUs or size of remaining memory; and (3) accessibility of all running compute node, enforced and controlled by some additional access control module.

The optimization goal is to minimize the cross-lay traffic first and then reduce the cross-site traffic, without overloading any compute nodes. As illustrated by the example in FIG. 7 and FIG. 8, the data sources being produced by data producers p1, p2, p3, p4, p5 need to flow to the result consumer C1, via a set of configured computation task instances a1, a2, a3, b1. In this specific example, configured task instances a1 and a2 are assigned to node2, because node3 at the same site is already overloaded, otherwise node3 would be a better place to allocate task instances a1 and a2. The task instance b1 is assigned to node1 in site 1 at upper layer 0, because there is no capacity at site 2. Basically, the compute nodes associated with data producers may determine where the data sources are located in the hierarchical logical network topology, and the compute node associated with result consumers determine the final destination. The data sources and the final destination cannot be changed once data producers and result consumers have been associated with their nearby compute nodes. These associations can be changed by their mobility, but it will be managed by the mobility manager later on.

The embodiment of FIG. 7 and FIG. 8 is just an example. In the end, concrete optimized deployment plans will be up to the task assignment algorithms, performed by the Task Assignment Manager. In this step, it is to be emphasized that the usage of the proposed logical location information of compute nodes in their hierarchical topology is for the purpose of reducing cross-layer and cross-site traffic and data transmission latency.

Step 3. illustrated in FIG. 1—Automatically updating the deployment plan in real-time by monitoring the mobility of data producers, results consumers, and also compute nodes:

Regarding the mobility of moving objects, which could be data producers, result consumers, and a part of compute nodes, the execution plan and the deployment plan are to be adjusted by task manager accordingly. This can be done by task generator and task assignment manager respectively within the task manager, when notifications are received from the mobility manager as indicated in FIG. 1.

The mobility manager illustrated in FIG. 1 records the following geographic location information for all data producers, result consumers, and also computer nodes: (1)—physical geo-location information, e.g., such as the GPS coordination (latitude, longitude), the name of located city, district, and section; and (2) logical geo-location information in the hierarchical network topology: for compute nodes it is their layer number, site number and node number; for data producers it is the layer number, site number, and node number of their nearby or associated compute nodes.

Figure 9:
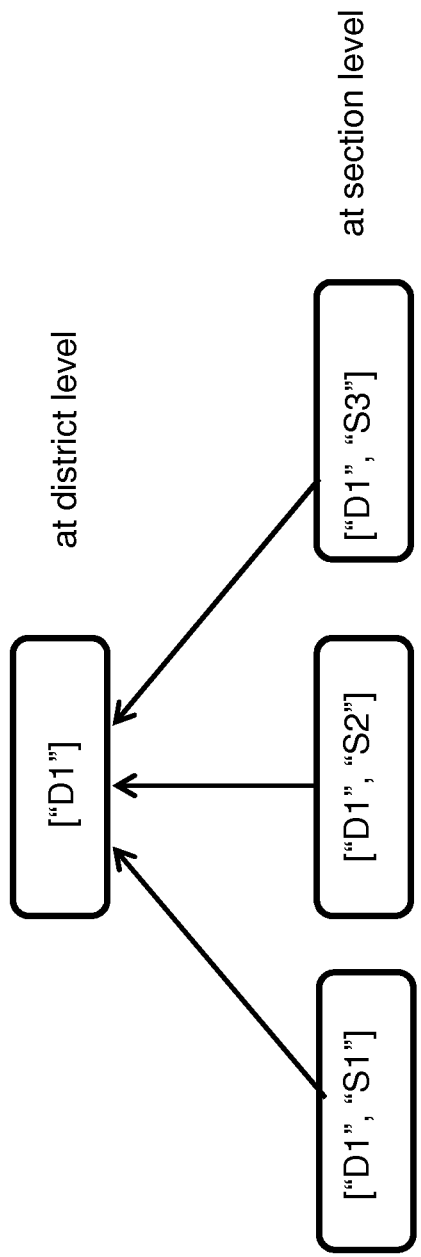
FIG. 9 is a schematic view illustrating an example of a geo-scope tree to be monitored by a mobility manager according to an embodiment of the present invention.

The mobility manager is responsible for watching out for the changes of moving objects for specific geo-scopes and notifying the task manager, in particular the task generator and the task assignment manager to do the following actions:

Task Generator automatically updates the execution plan according to the mobility of data producers and result consumers: When the task generator generates the initial execution plan, it will tell the mobility manager to watch out for a hierarchical geo-scope tree, e.g. as illustrated by FIG. 9, which covers all specific geo-scopes within the current execution plan. Whenever some moving object appears, leaves, or updates its geographic location, the mobility manager then checks whether this new geographic location leads to a new specific geo-scope at a certain level under the root of the geo-scope tree, or leads to an empty scope in the tree ("empty" means where is no object in this specific scope). These changes will be forwarded to the task generator to adjust the execution plan, such as "adding a new configured task with a new scope" or "deleting an existing configured task with an existing scope". After that, the updated execution plan is sent to the task assignment manager to change the deployment plan, such as scheduling out a new configured task at some compute node or terminating some scheduled tasks.

Figure 10:
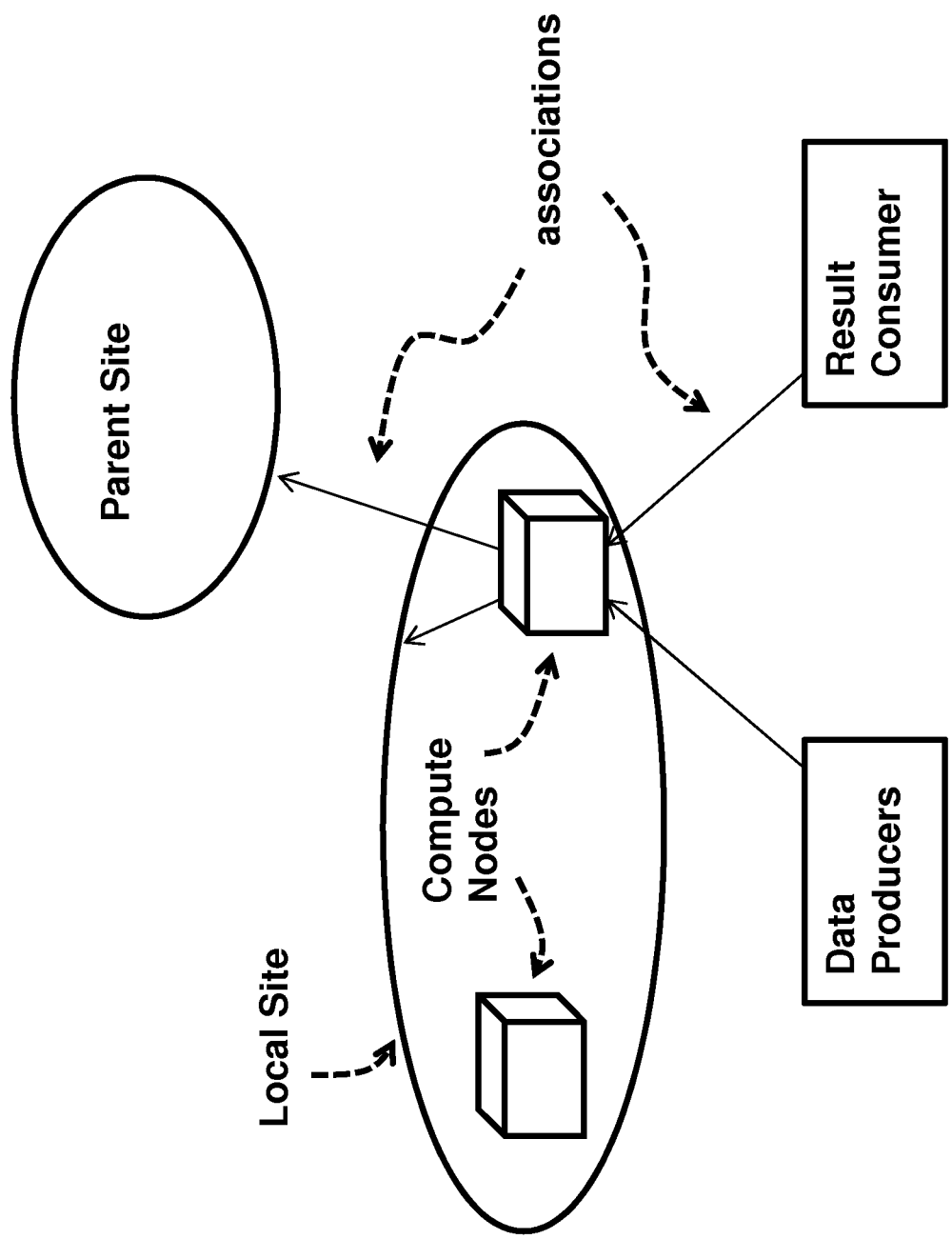
FIG. 10 is a schematic view illustrating an example of associations in a hierarchical network topology.

Task Assignment Manager automatically updates the deployment plan according to the changed link associations in the hierarchical logical network topology: As illustrated by FIG. 10, two types of associations may be established within the hierarchical logical network topology according to network proximity: both data producers and result consumers are associated with a nearby computer node, on the other hand each compute node may be associated with a local site and a parent site. The information of network proximity between moving objects can be provided by the underlying physical network. The mobility manager monitors the changes of these associations in the hierarchical topology and then informs the task assignment manager about the changes, so that the task assignment manager can adjust the deployment plan, e.g., migrating a running task from one compute node to another compute node.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing data stream processing tasks of a predefined application topology in a stream processing system,
the stream processing system comprising one or more data producers, one or more compute nodes, and one or more result consumers, wherein the one or more compute nodes and the one or more data producers are geographically distributed in different physical locations, the method comprising:
assigning geographic scope granularities to the data stream processing tasks of the predefined application topology, wherein the geographic scope granularities of the data stream processing tasks are defined based on geographic location attributes, including geographic location attribute values, associated with data streams, wherein each data stream processing task includes one or more unique geographic location attribute values;

receiving, by a task manager from a result consumer of the one or more result consumers, a subscription in order to trigger data processing for computing a result, the subscription including geographic scope related information concerning the triggered data processing;

generating, by the task manager, based on the geographic scope related information of the subscription and the geographic scope granularities assigned to the data stream processing tasks of the predefined application topology, an execution plan including one or more task instances for performing the triggered data processing, wherein a number of task instances for each data stream processing task included in the execution plan is based on a number of unique geographic location attribute values for each said data stream processing task;

generating, by the task manager from the execution plan, a deployment plan for deploying the task instances of the execution plan on the compute nodes based on physical location information of the one or more compute nodes and location information of the one or more data producers; and updating, by the task manager, the deployment plan in real-time based on detected changes of the physical location of the one or more compute nodes.

2. The method according to claim 1,
wherein the geographic scope related information of the subscription includes a stream type, and
wherein the stream type is an output stream type of one or more data stream processing tasks of the application topology in order to determine a set of data stream processing tasks that are to be involved in the triggered data processing.

3. The method according to claim 1,
wherein the geographic scope related information of the subscription includes one or more geographic scope constraints for determining a set of input streams that are to be processed by the triggered data processing, and
wherein the geographic scope constraints are defined based on the geographic location attributes associated with data streams.

4. The method according to claim 1, wherein the geographic location attributes associated with data streams include physical geographic locations and/or logical geographic locations of data producers generating the data streams.

5. The method according to claim 1, wherein one or more of the following properties of a data stream are considered for the geographic location attributes:
an identifier of a data producer of the one or more data producers that is generating the data stream;
coordinates of a location of the data producer generating the data stream;
an address of the location of the data producer generating the data stream; and
a logical location of a nearby compute node.

6. The method according to claim 1, further comprising determining the number of task instances for each of the data stream processing tasks included in the execution plan based on a geographic scope granularity of each said data stream processing task and based on geographic location attribute values of available data streams.

7. The method according to claim 1,
wherein the task instances of the execution plan are configured with input streams in a bottom-up manner, wherein each task instance of a data stream processing task is assigned to a unique geographic location attribute value of the geographic location attribute defined by a geographic scope granularity of the data stream processing task,
wherein task instances at the lowest layer get the input streams directly from available data streams belonging to their geographic location attribute values, and
wherein task instances at an upper layer get the input streams from output streams generated by task instances at the layer below.

8. The method according to claim 1,
wherein a minimal execution plan is generated by subtracting from the execution plan task instances that have already been triggered and executed by one or more prior subscriptions, and
wherein computed results of the already triggered and executed task instances are reused for the current triggered data processing.

9. The method according to claim 1,
wherein the compute nodes, the data producers and/or the result consumers of the stream processing system are associated with logical geographic location information in order to be organized within a hierarchical logical network topology,
wherein the task manager generates the deployment plan by using a heuristic optimization algorithm,
wherein task assignments of the deployment plan are computed based on the logical geographic location information of the compute nodes, the data producers and/or the result consumers such that cross traffic within the hierarchical logical network topology is reduced.

10. The method according to claim 9, wherein the computation of the task assignments of the deployment plan are further based on available resources of running compute nodes and/or based on accessibility of running compute nodes.

11. The method according to claim 1, wherein the data stream processing tasks of the application topology includes the following parameters:
a name of a task of the data stream processing tasks;
a name of an operation performed by the task;
a scope granularity of the task;
a type of one or more input streams to be subscribed by the operation associated with the task; and
a type of one or more output streams to be published by the operation associated with the task.

12. The method according to claim 1,
wherein a mobility manager is provided for monitoring and/or recording geographic location information of the data producers, the compute nodes and/or the result consumers, and
wherein the mobility manager notifies the task manager about changes of the geographic location information in order to update the execution plan and/or the deployment plan based on detected changes of the geographic location information.

13. The method according to claim 9, wherein the cross traffic within the hierarchical logical network topology is reduced without overloading compute nodes.

14. A stream processing system for managing data stream processing tasks of a predefined application topology, the system comprising:
one or more data producers;
one or more compute nodes wherein the one or more compute nodes and the one or more data producers are geographically distributed in different physical locations;

one or more result consumers; and a task manager, wherein the system is configured to assign geographic scope granularities to the data stream processing tasks of the predefined application topology, wherein the geographic scope granularities of the data stream processing tasks are defined based on geographic location attributes, including geographic location attribute values, associated with data streams, wherein each data stream processing task includes one or more unique geographic location attribute values, wherein a result consumer of the one or more result consumers is configured to send a subscription to the task manager in order to trigger data processing for computing a result, wherein the subscription includes geographic scope related information concerning the triggered data processing, wherein the task manager is further configured to generate an execution plan including one or more task instances for performing the triggered data processing based on the geographic scope related information of the subscription and the geographic scope granularities assigned to the data stream processing tasks of the predefined application topology, wherein a number of task instances for each data stream processing task included in the execution plan is based on a number of unique geographic location attribute values for each said data stream processing task wherein the task manager is further configured to generate from the execution plan a deployment plan for deploying the task instances of the execution plan on the compute nodes based on physical location information of the compute nodes and location information of the data producers; and wherein the task manager is further configured to update the deployment plan in real-time based on detected changes of the physical location of the one or more compute nodes.

15. The stream processing system according to claim 14, wherein the task manager is further configured to update the execution plan and/or the deployment plan based on detected changes of geographic location information of the data producers, the result consumers and/or the computer nodes during runtime.

* * * * *